US012355795B2

(12) United States Patent
Hayes et al.

(10) Patent No.: US 12,355,795 B2
(45) Date of Patent: Jul. 8, 2025

(54) APPLICATION SECURITY POSTURE IDENTIFIER

(71) Applicant: ZeroNorth, Inc., Boston, MA (US)

(72) Inventors: Patrick Hayes, Malden, MA (US); Thaddeus William Walsh, Columbia, MD (US)

(73) Assignee: Harness Inc., San Francisco, CA (US)

( * ) Notice: Subject to any disclaimer, the term of this patent is extended or adjusted under 35 U.S.C. 154(b) by 437 days.

(21) Appl. No.: 17/391,619

(22) Filed: Aug. 2, 2021

(65) Prior Publication Data

US 2023/0036680 A1 Feb. 2, 2023

(51) Int. Cl.
*H04L 9/40* (2022.01)
*G06F 16/955* (2019.01)

(52) U.S. Cl.
CPC ........ *H04L 63/1433* (2013.01); *G06F 16/955* (2019.01); *H04L 63/1425* (2013.01)

(58) Field of Classification Search
CPC .................. H04L 63/1433; H04L 63/1425; G06F 16/955
See application file for complete search history.

(56) References Cited

U.S. PATENT DOCUMENTS

| | | | |
|---|---|---|---|
| 7,340,726 B1 | 3/2008 | Chelf et al. | |
| 7,409,376 B2 | 8/2008 | Jameson | |
| 7,797,590 B2 | 9/2010 | Kaksonen | |
| 8,495,717 B1 * | 7/2013 | Beacham | ................ G06F 21/62 380/279 |
| 8,763,071 B2 | 6/2014 | Sinha et al. | |
| 8,875,298 B2 | 10/2014 | Li et al. | |
| 8,949,931 B2 | 2/2015 | Ermagan et al. | |
| 9,065,863 B1 * | 6/2015 | Tharakan | ............ H04L 61/4511 |
| 9,160,768 B2 | 10/2015 | Sikka et al. | |
| 9,246,906 B1 * | 1/2016 | Zhou | ..................... H04L 63/083 |
| 9,258,320 B2 | 2/2016 | Hayrynen et al. | |
| 9,262,132 B1 | 2/2016 | Lugton | |

(Continued)

OTHER PUBLICATIONS

International Patent Application No. PCT/US2022/038056, International Search Report and Written Opinion dated Nov. 7, 2022, 8 pages.

*Primary Examiner* — Aravind K Moorthy
(74) *Attorney, Agent, or Firm* — Bachmann Law Group PC

(57) ABSTRACT

Methods, systems, and apparatus, including computer programs encoded on a computer storage medium, for determining the security posture of an application are disclosed. In one aspect, a method includes the actions of receiving data identifying an application. The actions further include determining an FQDN of the application. The actions further include receiving data identifying a computing infrastructure. The actions further include determining a computing instance of the computing infrastructure. The actions further include determining an FQDN of the computing instance. The actions further include determining whether to provide, for output, data indicating whether the FQDN of the application matches the FQDN of the computing instance. The actions further include combining data indicating the vulnerabilities of the application and data indicating the vulnerabilities of the computing instance. The actions further include outputting, to a user associated with the application and to a user associated with the computing infrastructure, the combined data.

20 Claims, 7 Drawing Sheets

(56) References Cited

U.S. PATENT DOCUMENTS

| | | | |
|---|---|---|---|
| 9,378,013 B2 | 6/2016 | Tibble | |
| 9,443,086 B2 | 9/2016 | Shankar | |
| 9,503,452 B1* | 11/2016 | Kumar | H04L 63/0838 |
| 9,521,157 B1* | 12/2016 | D'Aveta | H04L 63/1483 |
| 9,531,726 B2 | 12/2016 | Iverson et al. | |
| 9,590,880 B2 | 3/2017 | Ashby et al. | |
| 9,612,943 B2 | 4/2017 | Boshernitsan et al. | |
| 9,697,362 B2 | 7/2017 | Kaplan et al. | |
| 9,921,952 B2 | 3/2018 | Dean et al. | |
| 9,946,525 B2 | 4/2018 | Tibble et al. | |
| 9,952,790 B2 | 4/2018 | Kamble | |
| 9,977,904 B2 | 5/2018 | Khan et al. | |
| 10,181,981 B2 | 1/2019 | Degioanni | |
| 10,216,611 B2 | 2/2019 | Dillinger | |
| 10,261,883 B2 | 4/2019 | Tibble et al. | |
| 10,303,448 B2 | 5/2019 | Steven et al. | |
| 10,346,294 B2 | 7/2019 | Schaik | |
| 10,911,558 B1* | 2/2021 | Witzel | H04L 41/40 |
| 11,019,114 B2 | 5/2021 | Cetin et al. | |
| 11,102,058 B1* | 8/2021 | Hua | H04L 41/0668 |
| 11,113,186 B1* | 9/2021 | Hussain | G06F 11/3664 |
| 11,171,834 B1* | 11/2021 | Bockelmann | G06F 9/44505 |
| 11,240,127 B1* | 2/2022 | Hevenor | H04L 41/0681 |
| 11,252,572 B2* | 2/2022 | Salmela | H04L 63/166 |
| 11,265,292 B1* | 3/2022 | Leviseur | H04L 63/0263 |
| 11,316,822 B1* | 4/2022 | Gawade | H04L 61/5061 |
| 11,323,877 B1* | 5/2022 | Verma | H04W 12/06 |
| 11,385,938 B2* | 7/2022 | Kim | H04L 43/0817 |
| 11,502,905 B1* | 11/2022 | Blackburn | H04L 41/0843 |
| 11,546,219 B1* | 1/2023 | Groenewald | H04L 41/5048 |
| 11,570,278 B1* | 1/2023 | Uthaman | H04L 41/0894 |
| 11,588,819 B1* | 2/2023 | Wei | H04L 67/1097 |
| 11,704,145 B1* | 7/2023 | Katcoff | G06F 9/5077 |
| | | | 718/1 |
| 11,811,886 B2* | 11/2023 | Wang | H04L 47/823 |
| 11,816,236 B1* | 11/2023 | Gupta | G06F 16/907 |
| 11,824,918 B1* | 11/2023 | Zhao | H04L 67/02 |
| 2003/0163730 A1* | 8/2003 | Roskind | H04L 63/083 |
| | | | 726/5 |
| 2009/0092247 A1* | 4/2009 | Kido | H04L 9/3263 |
| | | | 380/30 |
| 2013/0085914 A1* | 4/2013 | McPherson | H04L 63/0823 |
| | | | 705/34 |
| 2016/0134658 A1* | 5/2016 | Akiyama | H04L 63/145 |
| | | | 726/23 |
| 2016/0285628 A1* | 9/2016 | Carrer | H04L 9/321 |
| 2016/0337341 A1* | 11/2016 | Purusothaman | H04L 63/20 |
| 2017/0012947 A1* | 1/2017 | Lee | H04W 76/10 |
| 2017/0126664 A1* | 5/2017 | Khandelwal | H04L 63/0823 |
| 2017/0142144 A1* | 5/2017 | Weinberger | H04L 63/1408 |
| 2017/0164195 A1* | 6/2017 | Stammers | H04W 48/20 |
| 2017/0279792 A1* | 9/2017 | Tse | H04L 63/062 |
| 2017/0289799 A1* | 10/2017 | Hawkes | H04W 12/35 |
| 2017/0295494 A1* | 10/2017 | Counterman | H04L 63/18 |
| 2017/0374016 A1* | 12/2017 | Reddy | H04L 61/4511 |
| 2018/0183812 A1* | 6/2018 | Maresca | H04L 9/3247 |
| 2018/0191708 A1* | 7/2018 | Saha | G06F 21/31 |
| 2018/0295506 A1* | 10/2018 | Hawkes | G06F 21/44 |
| 2018/0309772 A1* | 10/2018 | Song | H04L 63/101 |
| 2019/0014088 A1* | 1/2019 | Subramaniyan | H04L 63/0281 |
| 2019/0087165 A1* | 3/2019 | Stella | G06F 8/48 |
| 2019/0095230 A1 | 3/2019 | Glessner et al. | |
| 2019/0200205 A1* | 6/2019 | Mikan | H04W 4/90 |
| 2019/0272157 A1* | 9/2019 | Stella | G06F 40/143 |
| 2019/0373471 A1* | 12/2019 | Li | H04L 9/3247 |
| 2020/0045148 A1* | 2/2020 | Mishra | H04L 12/4633 |
| 2020/0089869 A1 | 3/2020 | Richardson et al. | |
| 2020/0137566 A1* | 4/2020 | Jin | H04W 12/50 |
| 2020/0186527 A1* | 6/2020 | Delson | H04L 63/0428 |
| 2020/0244549 A1* | 7/2020 | Finch | H04L 67/53 |
| 2020/0287939 A1 | 9/2020 | Verma et al. | |
| 2020/0314065 A1 | 10/2020 | Roy et al. | |
| 2020/0322423 A1* | 10/2020 | Sheth | H04L 63/0823 |
| 2020/0322453 A1* | 10/2020 | Said | H04L 67/1097 |
| 2020/0329072 A1* | 10/2020 | Dubois | G08B 21/18 |
| 2020/0336464 A1* | 10/2020 | Hastings | H04L 9/0841 |
| 2020/0349120 A1* | 11/2020 | Crane | G06Q 10/101 |
| 2021/0021629 A1* | 1/2021 | Dani | H04L 63/1433 |
| 2021/0049049 A1* | 2/2021 | Kuik | G06F 9/5033 |
| 2021/0084008 A1 | 3/2021 | Kuperman et al. | |
| 2021/0160162 A1* | 5/2021 | Abbas | H04L 43/0817 |
| 2021/0160241 A1* | 5/2021 | Andreev | H04L 63/062 |
| 2021/0194820 A1* | 6/2021 | Obezuk | H04L 47/762 |
| 2021/0211879 A1* | 7/2021 | Zisimopoulos | H04W 12/08 |
| 2021/0266185 A1* | 8/2021 | Konda | H04L 61/4511 |
| 2021/0274344 A1* | 9/2021 | Cheng | H04W 4/40 |
| 2021/0286697 A1* | 9/2021 | Yang | G06F 11/3452 |
| 2021/0314171 A1* | 10/2021 | Choyi | H04L 9/3247 |
| 2021/0318913 A1* | 10/2021 | Moyer | H04L 61/3025 |
| 2021/0328809 A1* | 10/2021 | Gessner | H04L 63/123 |
| 2021/0385217 A1* | 12/2021 | Benko | H04L 63/0815 |
| 2022/0043642 A1* | 2/2022 | Maturi | G06F 8/60 |
| 2022/0078209 A1* | 3/2022 | V | H04L 63/105 |
| 2022/0086846 A1* | 3/2022 | Sharma | H04W 72/543 |
| 2022/0116376 A1* | 4/2022 | Stayskal | H04L 63/20 |
| 2022/0210154 A1* | 6/2022 | Gupta | H04L 63/0876 |
| 2022/0222096 A1* | 7/2022 | Archie | G06F 8/63 |
| 2022/0239696 A1* | 7/2022 | Konda | H04L 61/4511 |
| 2022/0272117 A1* | 8/2022 | Maheve | H04L 63/1416 |
| 2022/0312188 A1* | 9/2022 | Guo | H04W 60/00 |
| 2022/0321467 A1* | 10/2022 | Szigeti | H04L 45/74 |
| 2022/0376925 A1* | 11/2022 | Kaizer | H04L 61/4511 |
| 2022/0377135 A1* | 11/2022 | Boshev | H04L 67/1001 |
| 2022/0398187 A1* | 12/2022 | Balasubramanian | |
| | | | G06F 11/3684 |
| 2023/0004415 A1* | 1/2023 | Luo | H04L 65/80 |
| 2023/0032806 A1* | 2/2023 | Singh | H04L 41/5054 |
| 2023/0199480 A1* | 6/2023 | Tao | H04W 8/26 |
| | | | 370/338 |
| 2023/0261998 A1* | 8/2023 | Albrecht | H04L 63/0236 |
| | | | 370/235 |

* cited by examiner

APPLICATION SECURITY POSTURE IDENTIFIER

BACKGROUND

In computer security, a vulnerability is a weakness that can be exploited by a threat actor, such as an attacker, to cross privilege boundaries such as performing unauthorized actions within a computer system. To exploit a vulnerability, an attacker may need at least one applicable tool or technique that can connect to a system weakness.

Vulnerability management is a cyclical practice that may relate to processes that include discovering assets, assessing or performing a vulnerability scan, reporting on results, prioritizing vulnerabilities, remediating vulnerabilities, and/ or verifying remediation. This process may be continuously repeated as the assets are updated.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
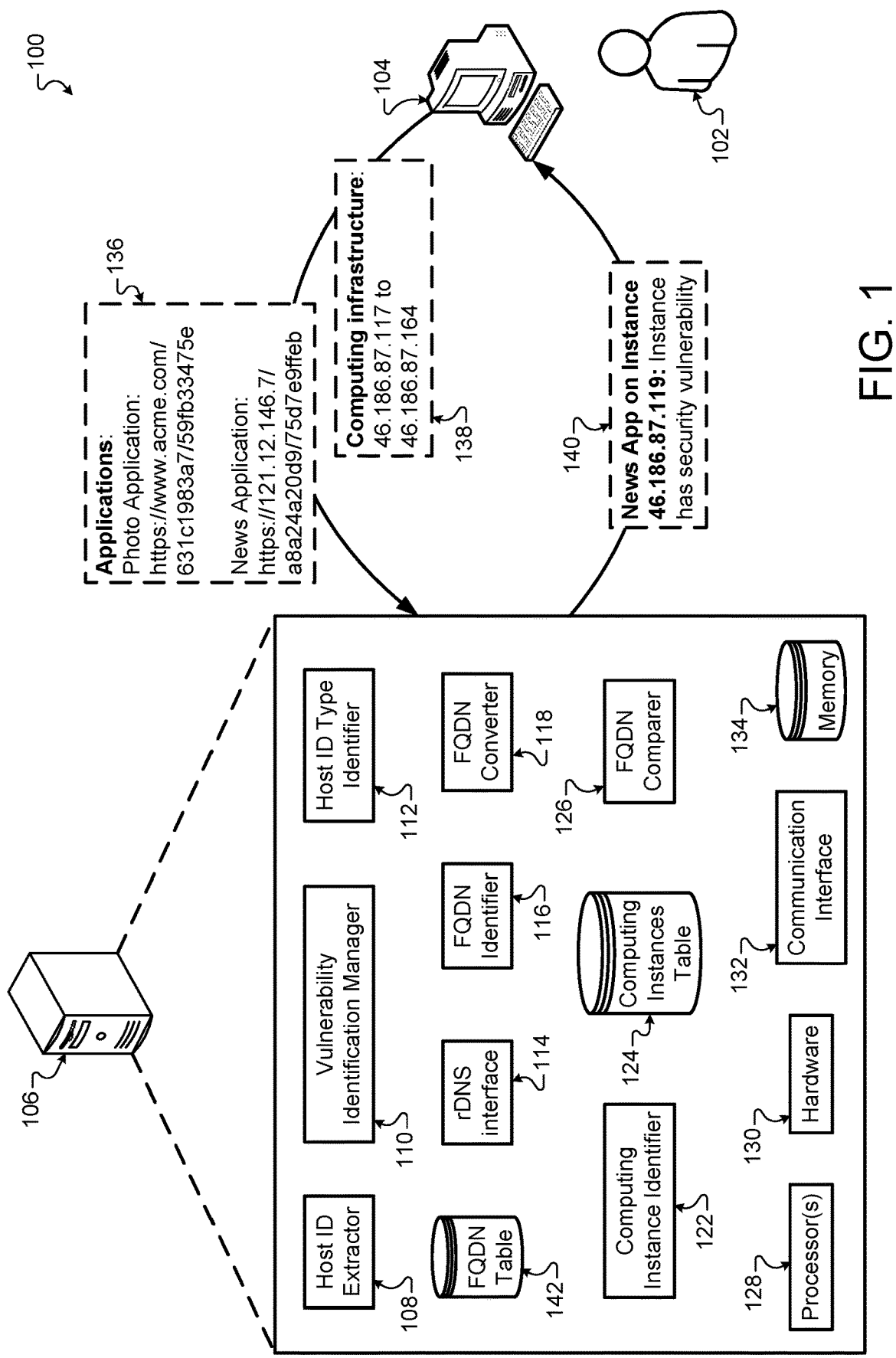
FIG. 1 illustrates an example system that is configured to determine the holistic security posture of an application.

Applications do not run in a vacuum, instead they are hosted on some computing infrastructure. To present a holistic view of an application's security posture, the techniques described below provide users with a mechanism that correlates and/or maps a software application to the infrastructure it runs on. The technology described below integrates with systems that are designed to identify vulnerabilities in software application and computing infrastructure.

Determining an application's overall security posture involves not only knowing the security status of the application itself but also the security status of the infrastructure it runs on. This may require users to derive the overall security posture by selecting and combining multiple disparate reports, which can be both tedious and error prone. The technology described below is able to calculate the mapping between an application and its infrastructure. It also calculates the union of vulnerabilities found in the application and its infrastructure. This provides a mechanism to view the vulnerabilities associated with the one or more infrastructure assets along with the vulnerabilities associated with the application. This allows the asset owner to be aware of the application vulnerabilities, and application owner to be aware of infrastructure asset vulnerabilities.

The technology described below correlates or maps an application to the infrastructure assets upon which it runs. Once this mapping has been performed, a system that determines the vulnerabilities of the application and/or the infrastructure assets may calculate the union of vulnerabilities, which provides a detailed view of the application's overall security posture. The technology may use one or more techniques to correlate or map an application to the infrastructure assets upon which it runs. A first technique may involve mapping from the application's service URL to a fully qualified domain name (FQDN), map from each infrastructure asset's host ID to an FQDN, and then generate a list of infrastructure assets whose FQDNs match the application's FQDN. A second technique involves mapping an application to source repositories. Some systems that are designed to identify vulnerabilities in software include an "application" capability that groups related targets. A third technique involves leveraging an up-to-date configuration management database (CMDB) to determine the complete set of infrastructure assets used by the target application. A fourth technique involves leveraging tags to map between an application and its underlying infrastructure assets.

There may be various cases where users may benefit from the technology described below. A first example may be users who run dynamic application security testing scanners (e.g., IBM AppScan, Fortify-on-Demand, Qualys, or OWASP Zap) and want to know not only the vulnerabilities of the application but also the vulnerabilities of the underlying infrastructure. A second example may involve users who use a CMDB as part of their IT operations and want to derive additional value from their CMDB. A third example may involve users who run dynamic infrastructure scanners (e.g., AWS Security Hub, Nikto, Nmap, or Tenable.io) and want to know not only the vulnerabilities of the infrastructure but also the vulnerabilities of corresponding applications.

FIG. 1 illustrates an example system 100 that is configured to determine the holistic security posture of an application. Briefly, and as described in more detail below, the system 100 includes a server 106 that is configured to receive identifiers for one or more applications and identifiers for computing infrastructure. The server 106 determines a mapping between the applications and the computing infrastructure. Using that mapping the server 106 is able to connect the vulnerabilities of the infrastructure to the applications and the vulnerabilities of the applications to the infrastructure. This provides the user 102 with a holistic view of the security posture of the applications beyond that which would be apparent from analyzing the applications in isolation.

In more detail, the user 102 may wish to determine the security posture of various applications. The security posture may include the vulnerabilities of the various applications and the computing infrastructure that runs the various applications. The user 102 may use various scanning tools to identify security vulnerabilities of the applications. The scanning tools may identify vulnerabilities independent of the infrastructure that is running the applications. However, the infrastructure that is running the applications may have its own vulnerabilities that may compromise the security of the applications.

To determine which applications are running on which computing instances of the infrastructure, the user 102 may use computing device 104 to provide the server 106 with application identifiers 136. The application identifiers 136 may be a name of the application, a uniform resource locator (URL) of the application, a tag of the application, and/or any other similar type of identifier. For example, the application identifiers 136 may include a URL of a photos application and a URL of a news application. The user 102 may also use the computing device 104 to provide the server 106 with computing infrastructure identifiers 138. The computing infrastructure identifiers 138 may include one or more uniform resource locators of the computing infrastructure, one or more internet protocol (IP) addresses, one or more computing infrastructure tags, and/or any other similar type of identifier. For example, the computing infrastructure identifiers 138 may include the range of IP addresses from 46.186.87.117 to 46.186.87.164.

The server 106 may include a host identifier (ID) extractor 108. The host ID extractor 108 may be configured to parse the application identifiers 136 and extract the host ID from the application identifiers 136. In the case of the application identifiers 136 being a URL, the host ID extractor 108 may be configured to identify the protocol, subdomain, second-level domain, top-level domain, IP address, subdirectory, filename, and/or any other parts of the URL. In some instances, one or more of these parts of a URL may not be included in the application identifiers 136. The host ID extractor 108 may be configured to identify those parts of the URL that correspond to the host ID. The host ID extractor 108 may remove the protocol, subdirectory, and filename from the URL. The remaining parts may be the subdomain, second-level domain, and top-level domain. These parts of the URL may be the host ID.

For the URL https://www.acme.com/631c1983a7/59fb33475e, the host ID extractor 108 may identify "https://" as the protocol, "www" as the subdomain, "acme" as the second-level domain, "corn" as the top-level domain, "631c1983a7" as the subdirectory, and "59fb33475e" as the filename. The host ID extractor 108 may remove "https://," "631c1983a7," and "59fb33475e" which leaves www.acme.com as the host ID. For the URL https://121.12.146.7/a8a24a20d9/75d7e9ffeb, the host ID extractor 108 may identify "https://" as the protocol, "121.12.146.7" as the IP address, "a8a24a20d9" as the subdirectory, and "75d7e9ffeb" as the filename. The host ID extractor 108 may remove "https://," "a8a24a20d9," and "75d7e9ffeb" which leaves 121.12.146.7 as the host ID.

The server 106 may include a host ID type identifier 112. The host ID type identifier 112 may be configured to determine the type of host ID that the host ID extractor 108 identified. Some of the different types may include a host name or an IP address. The host ID type identifier 112 may identify the type of host ID by identifying characteristics of the different types of host IDs. The host ID type identifier 112 may determine that the host ID is an IP address if the host ID includes an address in the internet protocol (IP) version 4 format or the internet protocol (IP) version 6 format. The host ID type identifier 112 may determine that the host ID is a host name if the host ID does not strictly conform to either the IPv4 or IPv6 address formats. In some implementations, the host ID type identifier 112 may parse the host ID using a colon as a delimiter. If the strings between the colons conform to the IPv6 format, then the host ID type identifier 112 may determine that the host ID is an IP address. In some implementations, the host ID type identifier 112 may parse the host ID using a period as a delimiter. If the strings between the periods conform to the IPv4 format, then the host ID type identifier 112 may determine that the host ID is an IP address. If the strings between the periods do not conform or there are not exactly three periods, then the host ID type identifier 112 may determine that the host ID is a host name.

For the host ID "121.12.146.7," the host ID type identifier 112 may determine that the host ID is an IP address because the format of "121.12.146.7" matches the IP version 4 format. The host ID type identifier 112 may determine that the host ID contains no colons and therefore does not comply with the IPv6 format. For the host ID "www.acme.com," the host ID type identifier 112 may identify "www," "acme," and "corn" as the strings between the periods. The host ID type identifier 112 may determine that the host ID is a host name based on "www," "acme," and "corn" not complying with the IPv4 format.

Based on the type of host ID that the host ID type identifier 112 identifies, the host ID type identifier may provide that data to the reverse domain name service (rDNS) interface 114 or the fully qualified domain name (FQDN) identifier 116. If the host ID type identifier 112 determine that the host ID is an IP address, then the host ID type identifier 112 may provide the host ID to the rDNS interface 114. If the host ID type identifier 112 determines that the host ID is a host name, then the host ID type identifier 112 may provide the host ID to the FQDN identifier 116. Following the example from above, the host ID type identifier 112 may provide the IP address "121.12.146.7" to the rDNS interface 114, and the host name "www.acme.com" to the FQDN identifier 116.

The rDNS interface 114 may be configured to determine the FQDN of the IP address received from the host ID type identifier 112. The rDNS interface 114 may provide the IP address to a rDNS service that is configured to receive IP addresses and provide the fully qualified domain name that corresponds to the IP address. In some instances, an external computing device may implement the rDNS service. For example, the rDNS interface 114 may provide the IP address "121.12.146.7" to the rDNS service. The rDNS interface 114 may receive the FQDN of "apps.globex.com" from the rDNS service. The rDNS interface 114 may store the FQDNs in the FQDN table 142.

The FQDN identifier 116 may be configured to determine whether the host name received from the host ID type identifier 112 is an FQDN. The FQDN identifier 116 may determine whether the received host name is unambiguous and specifies an exact location in the tree hierarchy of the domain name system. An FQDN may include a subdomain, a second-level domain, and a top-level domain. Following the example from above, the host name "www.acme.com" is an FQDN because it ends in a top-level domain and is unambiguous. An example host name that is not an FQDN may be "apps.globex" which does not end in a top-level domain such as ".com" or ".org" and is not unambiguous. Another host name that is not an FQDN may be "globex.com" which does end in a top-level domain but is not unambiguous. For example, "globex.com" includes "www.globex.com," "apps.globex.com," and additional FQDNs. In instances where the FQDN identifier 116 determines that the host name is an FQDN, the FQDN identifier 116 may store the FQDN in the FQDN table 142.

If the FQDN identifier 116 determines that the host name is not an FQDN, then the FQDN identifier 116 may provide the host name to the FQDN converter 118. The FQDN converter 118 may be configured to convert the host name that is not an FQDN to an FQDN. The FQDN converter 118 may add additional domains to the received host name to convert the host name to an FQDN. For example, the FQDN converter 118 may add "www." to the host name "globex.com" or add ".com" to the host name "apps.globex". In some implementations, the FQDN converter 118 may use URL from the application identifiers 136 to determine what domains to add to the host name to convert the host name to an FQDN. The FQDN converter 118 may add an additional domain to the host ID of the URL. If the original URL and the updated URL identify the same location, then the FQDN converter 118 has added the correct domain. Once the FQDN converter 118 converts the host name that is not an FQDN to an FQDN, the FQDN converter 118 may store the FQDN in the FQDN table 142.

The server 106 may include a computing instance identifier 122. The computing instance identifier 122 may be configured to identify the computing instances that are included in the computing infrastructure identifiers 138. The computing infrastructure may include one or more computing devices that other devices may access. The computing infrastructure may be partitioned into various computing instances that may run the various applications. The computing instance identifier 122 may store the identified computing instances in the computing instances table 124. The computing instance identifier 122 may be configured to identify both physical and virtual computing instances that are included in the computing infrastructure identifiers 138. For example, the computing infrastructure identifiers 138 may specify a range of IP addresses from 46.186.87.117 to 46.186.87.164. The computing infrastructure identifiers 138 may iterate through the IP addresses and identify the computing instances of each IP address. The computing instance identifier 122 stores the identifiers of those computing instances in the computing instances table 124. The identifiers of the computing instances may be host IDs. For example, the computing instances table 124 may store the host IDs 46.186.87.117, 46.186.87.118, 46.186.87.119, up to 46.186.87.164.

The host ID type identifier 112, the rDNS interface 114, the FQDN identifier 116, and the FQDN converter 118 may be used to analyze the computing instance host IDs in the computing instances table 124. These components may analyze the computing instance host IDs in the computing instances table 124 in a similar fashion as analyzing the application identifiers 136 described above.

The host type identifier 112 may access a computing instance host ID from the computing instances table. The host type identifier 112 may determine the type of host ID of the computing instance host ID. Some of the different types may include a host name or an IP address. The host ID type identifier 112 may identify the type of host ID by identifying characteristics of the different types of host IDs. The host ID type identifier 112 may determine that the computing instance host ID is an IP address if the computing instance host ID includes an address in the internet protocol (IP) version 4 format or the internet protocol (IP) version 6 format. The host ID type identifier 112 may determine that the computing instance host ID is a host name if the computing instance host ID does not strictly conform to either the IPv4 or IPv6 address formats. In some implementations, the host ID type identifier 112 may parse the computing instance host ID using a colon as a delimiter. If the strings between the colons conform to the IPv6 format, then the host ID type identifier 112 may determine that the computing instance host ID is an IP address. In some implementations, the host ID type identifier 112 may parse the computing instance host ID using a period as a delimiter. If the strings between the periods conform to the IPv4 format, then the host ID type identifier 112 may determine that the computing instance host ID is an IP address. If the strings between the periods do not conform or there are not exactly three periods, then the host ID type identifier 112 may determine that the computing instance host ID is a host name.

As an example, the host ID type identifier 112 may access the computing instance host ID of 46.186.87.119. The host ID type identifier 112 may determine that the computing instance host ID has a format that matches the IP version 4 format. Based on this, the host ID type identifier 112 determines that the computing instance host ID of 46.186.87.119 is an IP address.

Based on the type of host ID that the host ID type identifier 112 identifies, the host ID type identifier may provide that data to the rDNS interface 114 or the FQDN identifier 116. If the host ID type identifier 112 determine that the computing instance host ID is an IP address, then the host ID type identifier 112 may provide the computing instance host ID to the rDNS interface 114. If the host ID type identifier 112 determines that the computing instance host ID is a host name, then the host ID type identifier 112 may provide the computing instance host ID to the FQDN identifier 116. Following the example from above, the host ID type identifier 112 may provide the IP address "46.186.87.119" to the rDNS interface 114.

The rDNS interface 114 may be configured to determine the FQDN of the IP address received from the host ID type identifier 112 in a fashion similar to that described above. The rDNS interface 114 may receive an IP address and interface with an rDNS service. The rDNS interface 114 may receive a corresponding FQDN from the rDNS service for the specified IP address. For example, the rDNS interface may provide the IP address "46.186.87.119" to the rDNS service. The rDNS interface 114 may receive the FQDN of "apps.globex.com" from the rDNS service.

The rDNS interface 114 may provide the computing instance FQDN to the FQDN comparer 126. The FQDN comparer 126 may be configured to compare the computing instance FQDN to the FQDN table 142 that includes the FQDNs of the applications. The FQDN comparer 126 may determine whether the computing instance FQDN matches any of the FQDNs of the applications of the FQDN table 142. The FQDN comparer 126 may determine that the FQDNs match if the FQDNs are the same. For example, if the computing instance FQDN is "apps.globex.com" and the FQDN table 142 includes "www.acme.com" and "apps.globex.com," then the FQDN comparer 126 may determine that the computing instance FQDN matches "apps.globex.com." Based on this determination, the FQDN comparer 126 may flag the computing instance FQDN as matching an application FQDN.

If the host ID type identifier 112 determines that the computing instance host ID is a host name, then the host ID type identifier 112 may provide the computing instance host name to the FQDN identifier 116. The FQDN identifier 116 may operate in conjunction with the FQDN converter 118 to determine whether the computing instance host name is an FQDN. If the FQDN identifier 116 determines that the computing instance host name is an FQDN, then the FQDN comparer 126 may compare the computing instance FQDN to the FQDN table 142 that includes the FQDNs of the applications. If the FQDN identifier 116 determines that the computing instance host name is not an FQDN, then the FQDN identifier 116 may provide the computing instance host name to the FQDN converter 118 to convert the computing instance host name that is not an FQDN to an FQDN. The FQDN converter 118 may convert the computing instance host name to an FQDN using a similar technique to that describe above with respect to the application host names.

Similar to when the rDNS interface 114 identifies the computing instance FQDN, the FQDN identifier 116 and/or FQDN converter 118 may provide the computing instance FQDN to the FQDN comparer 126. If the computing instance FQDN matches any of the FQDNs of the applications of the FQDN table 142, then the FQDN comparer 126 may flag the computing instance FQDN as matching an application FQDN. If the computing instance FQDN does not match any of the FQDNs of the applications of the FQDN table 142, then the FQDN comparer 126 may flag the computing instance FQDN as not matching any of the applications of the FQDN table 142.

The server 106 may include a vulnerability identification manager 110. The vulnerability identification manager 110 may be configured to use various scanning tools to identify the vulnerabilities of the applications identified in the application identifiers 136 and other applications. An example application vulnerability may be a tar vulnerability. A tar vulnerability may exist when a user is not properly warned when extracting setuid or setgid files. This may allow a local user or remote attacks to gain privileges. Another example application vulnerability may be a hardcoded credential such as a password. Another example application vulnerability may be a systemd vulnerability. A systemd vulnerability may exist when system-tmpfiles mishandle sym links present in non-terminal path components. This may allow local users to obtain ownership of arbitrary files via vectors.

The vulnerability identification manager 110 may also be configured to receive data indicating the vulnerabilities of the computing infrastructure and instances that correspond to the computing infrastructure identifiers 138 along with other computing infrastructure and instances. The vulnerability identification manager 110 may access the computing instances table 124 that relates the applications to the computing instances on which they run. The vulnerability identification manager 110 may be a relational database that relates the vulnerabilities of an application to the computing instance on which it runs and the vulnerabilities of a computing instance to the application that runs on it. An example vulnerability of the computing infrastructure and instances may include a vulnerability identifiable by a Nikto scanner. A Nikto identifiable vulnerability may indicate that the computing instance exposes access to a file that may contain sensitive information or may indicate that an anti-clickjacking X-frame-options header is not present. Another example vulnerability of the computing infrastructure and instances may include a vulnerability identifiable by a Prowler scanner. A Prowler identifiable vulnerability may indicate that the default security group of a virtual private cloud does not restrict all traffic. Another example vulnerability of the computing infrastructure and instances may include a vulnerability identifiable by an Nmap scanner. An Nmap identifiable vulnerability may indicate that port 443 of the transmission control protocol is open.

The vulnerability identification manager 110 may be configured to generate a notification that relates the vulnerabilities of an application to the computing instance on which it runs and/or the vulnerabilities of a computing instance to the application that runs on it. The vulnerability identification manager 110 may provide the notification that relates the vulnerabilities of an application to the computing instance on which it runs to the users who may manage the computing infrastructure. The vulnerability identification manager 110 may provide the notification 140 that indicates the vulnerabilities of a computing instance to the application that runs on it to the users who may manage the application. For example, the vulnerability identification manager 110 may generate the notification 140 that indicates that the news application is running on the computing instance 46.186.87.119, and the computing instance 46.186.87.119 has a security vulnerability. The notification 140 may indicate the type of vulnerability, and the user 102 may update the news application or the computing instance to reduce the risk associated with the security vulnerability of computing instance 46.186.87.119.

The server 106 may include a communication interface 132, one or more processors 128, memory 134, and hardware 130. The one or more processors may implement the host ID extractor 108, the vulnerability identification manager 110, the host ID type identifier 112, the rDNS interface 114, the FQDN identifier 116, the FQDN converter 118, the computing instance identifier 122, and/or the FQDN comparer 126. The communication interface 132 may include communication components that enable the server 106 to transmit data and receive data from devices connected to a wired and/or wireless network. The communication interface 132 may include an interface that is configured to communicate with network access points. The communication interface 132 may receive data that other devices transmit to the network access points and/or transmit data to the network access points for transmission to the other devices. In some implementations, the communication interface 132 may be configured to communicate over a wide area network, a local area network, the internet, a wired connection, a wireless connection, and/or any other type of network or connection. The wireless connections may include Wi-Fi, short-range radio, infrared, and/or any other wireless connection.

The hardware 130 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 134 may be implemented using computer-readable media, such as computer storage media. The memory 134 may store the FQDN table and/or the computing instances table 124. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. In some implementations, the data stored in the memory 134 may be stored externally from the server 106.

Figure 2:
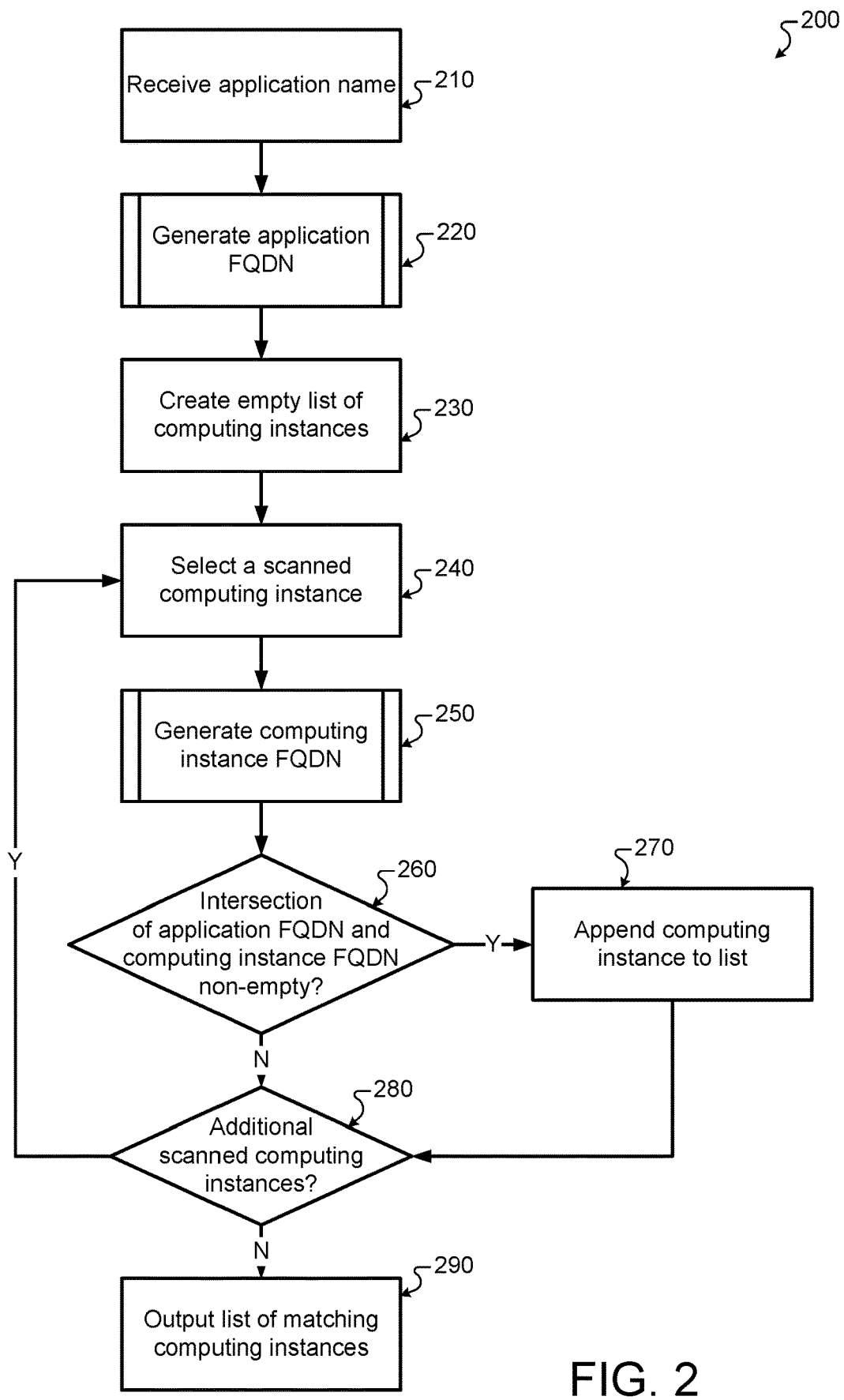
FIG. 2 is a flowchart of an example process for determining the holistic security posture of an application.

FIG. 2 is a flowchart of an example process 200 for determining the holistic security posture of an application. In general, the process 200 receives identifiers of one or more applications and one or more identifiers of computing infrastructure that implement various computing instances. The process 200 determines which applications are running on which computing instances and outputs a list that includes that information. The process 200 will be described as being performed by the server 106 of FIG. 1 and will include references to other components in FIG. 1.

The server 106 receives an application name (210). The server 106 may receive the application name from a user. In some instances, the application name may be a URL or other type of identifier. If the server 106 receives an identifier of the application that is not a URL, then the server 106 may determine the URL of the application by requesting the URL from the user or accessing a database that may relate various identifiers of applications to their respective URLs.

Figure 3:
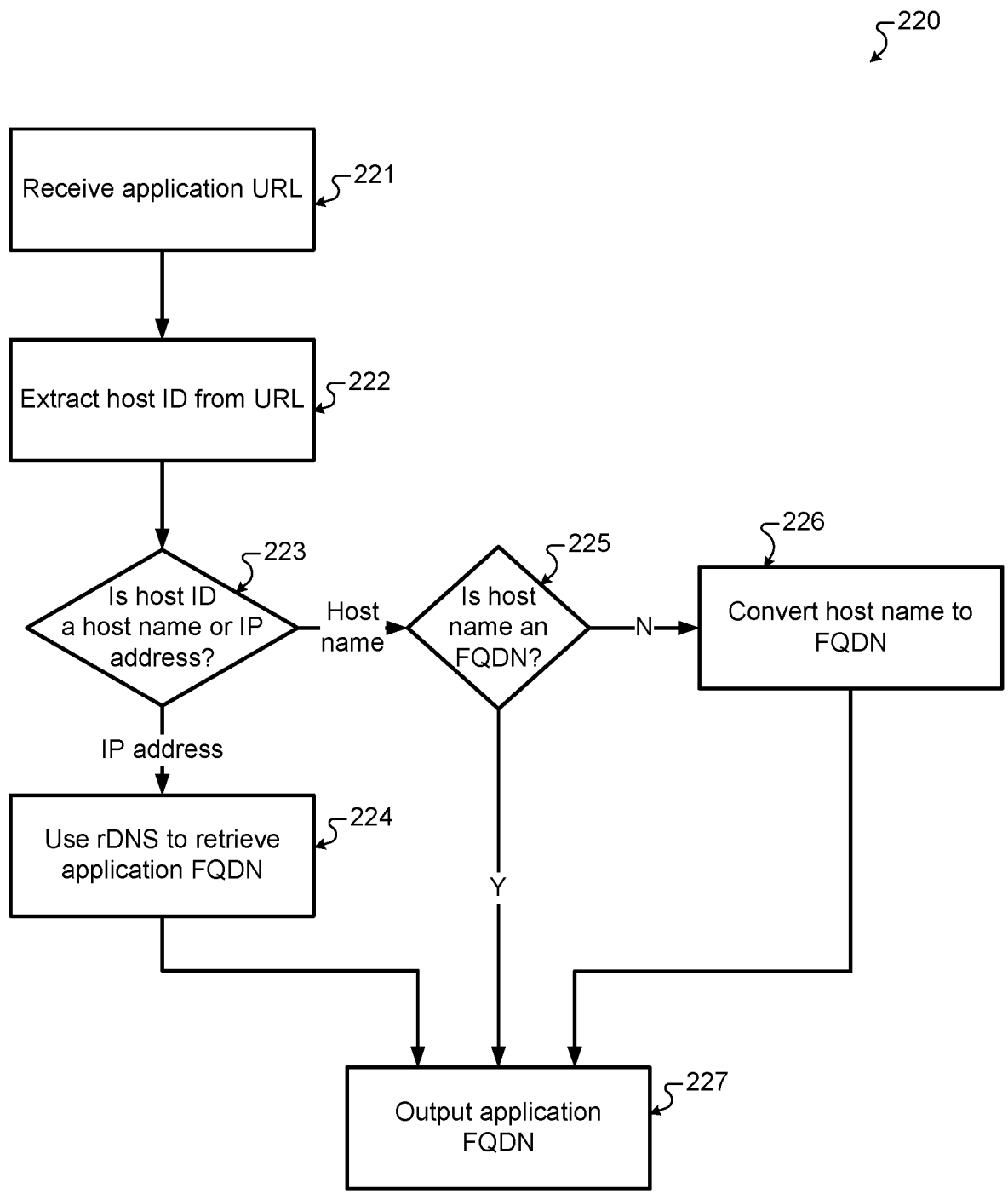
FIG. 3 is a flowchart of an example process for determining the fully qualified domain name of an application.

The server 106 generates an FQDN for the application (220). FIG. 3 is a flowchart of an example subroutine 220 for generating the FQDN of the application. The server 106 receives the application URL (221). The server 106 extracts the host ID from the application URL (222). The server 106 may be configured to parse the application URL. The server 106 may identify the protocol, subdomain, second-level domain, top-level domain, IP address, subdirectory, filename, and/or any other parts of the URL. The application URL may not include each one of these parts of a URL. Based on identifying these parts of the URL, the server 106 may extract the host ID. In some instances, the host ID may include the subdomain, the second-level domain, the top-level domain, and/or the IP address. The server 106 may discard the remaining parts of the application URL.

The server 106 may determine whether the application host ID is a host name or an IP address (223). The server 106 may compare the formats of different IP addresses to the application host ID. If the server 106 determines that the format of the application host ID matches a format of an IP address, then the server 106 may determine that the application host ID is an IP address. If the server 106 determines that the format of the application host ID does not match the format of an IP address, then the server 106 may determine that the application host ID is a host name.

The server 106 may take different actions depending on whether the application host ID is a host name or an IP address. If the server 106 determines that the application host ID is an IP address, then the server 106 uses rDNS to retrieve the application FQDN (224). The server 106 may provide the application IP address to an rDNS server. The server 106 may request, from the rDNS server, an FQDN for the application IP address. The server 106 receives, from the rDNS server, the application FQDN. The server 106 stores or outputs the application FQDN (227). The server 106 may store or output the application FQDN for comparison to other FQDNs.

If the server 106 determines that the application host ID is a host name, then the server 106 determines whether the application host name is an FQDN (225). If the server 106 determines that the application host name is an FQDN, then the server 106 stores or outputs the application FQDN (227). The server 106 may determine that the application host name is an FQDN by determining whether the application is unambiguous and specifies an exact location in the tree hierarchy of the domain name system. The server 106 may attempt to connect to the application host name. If the server 106 is able to connect to a computing device that corresponds to the application host name, then the server 106 may determine that the application host name is an FQDN. The server 106 may store or output the application FQDN for comparison to other FQDNs.

If the server 106 determines that the application host name is not an FQDN, then the server 106 converts the application host name to an FQDN (226). The server 106 may convert the application host name to an FQDN by adding additional domains to the application host name. In some instances, the server 106 may attempt to add one or more possible domains to the application host name such as "www." or ".com". In some instances, the server 106 may provide a request to a user for what additional domains to add to the application host name to convert the application host name to an FQDN. In some instances, the server 106 may confirm that the updated application host name is an FQDN by reperforming determining whether the updated application host name is an FQDN (225). Once the server 106 converts the application host name to an FQDN, the server 106 stores or outputs the application FQDN (227). The server 106 may store or output the application FQDN for comparison to other FQDNs.

The server 106 creates an empty set of computing instances (230). The server 106 may receive identifiers for a computing infrastructure that may be running the application. The computing infrastructure may include one or more computing instances that may be physical or virtual. The server 106 may determine each of the computing instances that are included in the computing infrastructure. In some implementations, the server 106 may request the computing instances included in the computing infrastructure by communicating with the computing infrastructure. In some implementations, the server 106 may determine the computing instances based on a range of the computing infrastructure. The server 106 may determine each of the computing instances that falls within the range of the computing infrastructure. For example, the range may be between the IP addresses from 46.186.87.117 to 46.186.87.164. The server 106 may create a list of computing instances that includes IP addresses 46.186.87.117, 46.186.87.118, 46.186.87.119, up to 46.186.87.164.

The server 106 selects a scanned computing instance (240). The server 106 may iterate through each of the computing instances in the infrastructure list. In some implementations, the infrastructure list may be an unordered set, and the server 106 may iterate through the computing instances in any order. The computing instances in the infrastructure list may be computing instance host IDs and the server 106 may convert the computing instance host IDs to FQDNs using a technique similar to stage 220.

Figure 4:
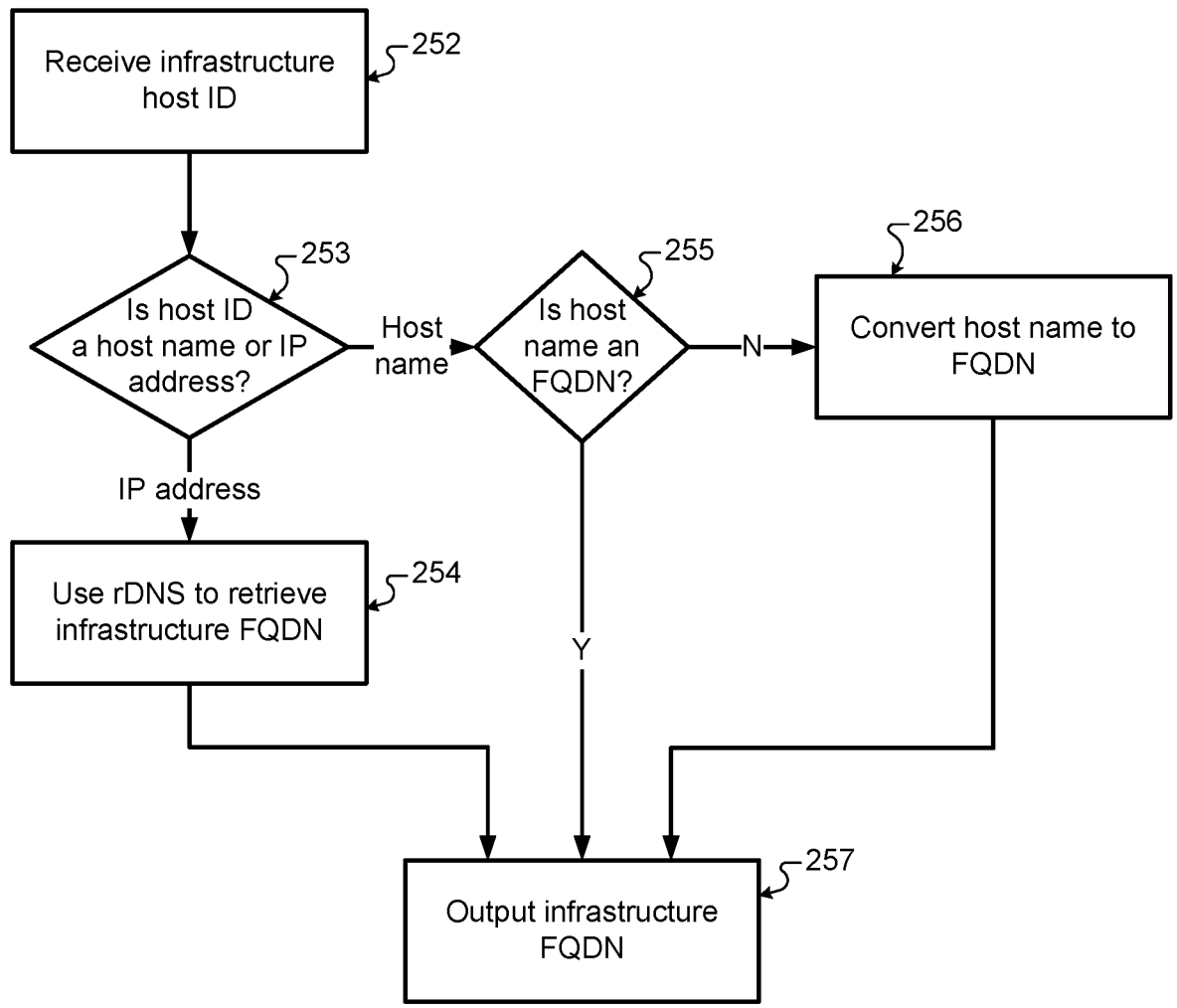
FIG. 4 is a flowchart of an example process for determining the fully qualified domain name of a computing instance.

FIG. 4 is a flowchart of an example subroutine 250 for generating the FQDN of a computing instance. The server 106 receives the computing instance host ID (252). The server 106 may determine whether the computing instance host ID is a host name or an IP address (253). The server 106 may compare the formats of different IP addresses to the computing instance host ID. If the server 106 determines that the format of the computing instance host ID matches a format of an IP address, then the server 106 may determine that the computing instance host ID is an IP address. If the server 106 determines that the format of the computing instance host ID does not match the format of an IP address, then the server 106 may determine that the computing instance host ID is a host name.

The server 106 may take different actions depending on whether the computing instance host ID is a host name or an IP address. If the server 106 determines that the computing instance host ID is an IP address, then the server 106 uses rDNS to retrieve the application FQDN (254). The server 106 may provide the computing instance IP address to an rDNS server. The server 106 may request, from the rDNS server, an FQDN for the computing instance IP address. The server 106 receives, from the rDNS server, the computing instance FQDN. The server 106 outputs the computing instance FQDN (257). The server 106 may output the computing instance FQDN for comparison to the application FQDN.

If the server 106 determines that the computing instance host ID is a host name, then the server 106 determines whether the computing instance host name is an FQDN (255). If the server 106 determines that the computing instance host name is an FQDN, then the server 106 outputs the computing instance FQDN for comparison to the application FQDN (257). The server 106 may determine that the computing instance host name is an FQDN by determining whether the application is unambiguous and specifies an exact location in the tree hierarchy of the domain name system. The server 106 may attempt to connect to the computing instance host name. If the server 106 is able to connect to a computing device that corresponds to the computing instance host name, then the server 106 may determine that the computing instance host name is an FQDN. The server 106 may output the computing instance FQDN for comparison to the application FQDN.

If the server 106 determines that the computing instance host name is not an FQDN, then the server 106 converts the computing instance host name to an FQDN (256). The server 106 may convert the computing instance host name to an FQDN by adding additional domains to the computing instance host name. In some instances, the server 106 may attempt to add one or more possible domains to the computing instance host name such as "www." or ".org". In some instances, the server 106 may provide a request to a user for what additional domains to add to the computing instance host name to convert the computing instance host name to an FQDN. In some instances, the server 106 may confirm that the updated computing instance host name is an FQDN by reperforming determining whether the updated computing instance host name is an FQDN (255). Once the server 106 converts the computing instance host name to an FQDN, the server 106 may output the computing instance FQDN for comparison to the application FQDN.

The server 106 may determine whether the intersection of the application FQDN and the computing instance FQDN is non-empty (260). The application FQDN and the computing instance FQDN may be in the form of a string. The server 106 may compare the strings of the application FQDN and the computing instance FQDN. If the strings match, then the server 106 may append the computing instance FQDN or other identifier to a list that includes the computing instances that are running the application (270). The server 106 may determine whether the intersection of the application FQDN and the computing instance FQDN is non-empty by accessing the application FQDN and the computing instance FQDN. If the server 106 accesses the same physical or virtual device, then the server 106 may determine that the intersection of the application FQDN and the computing instance FQDN is non-empty. In this case, the append the computing instance FQDN or other identifier to a list that includes the computing instances that are running the application (270).

The server 106 may determine whether there are additional scanned computing instances in the list of computing instances (280). If there are additional scanned computing instances, then the server 106 generates the corresponding additional computing instance FQDN (250) and determines whether the intersection of the application FQDN and the additional computing instance FQDN is non-empty (260). If there are no additional scanned computing instances, then the server 106 outputs the list of computing instances that match the application FQDN (290). This list of computing instances may indicate the computing instances that are running the application.

Figure 5:
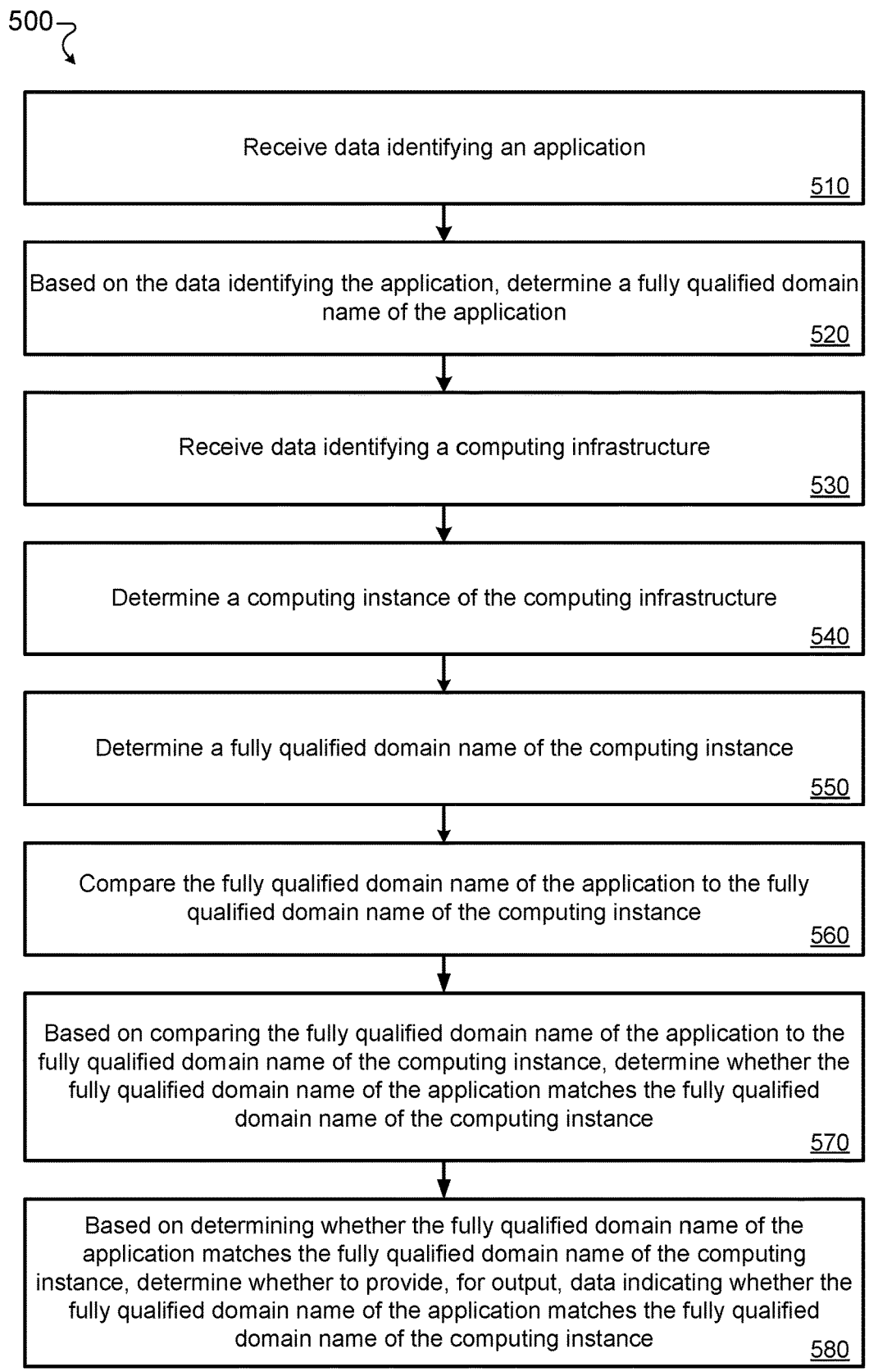
FIG. 5 is a flowchart of an example process for determining the holistic security posture of an application.

FIG. 5 is a flowchart of an example process 500 for determining the holistic security posture of an application. In general, the process 500 receives identifiers of one or more applications and one or more identifiers of computing infrastructure that implement various computing instances. The process 500 determines which applications are running on which computing instances and outputs a list that includes that information. The process 500 will be described as being performed by the server 106 of FIG. 1 and will include references to other components in FIG. 1.

The server 106 receives data identifying an application (510). In some implementations, the data identifying the application is a URL of the application. In some implementations, the data identifying the application is a tag of the application.

Based on the data identifying the application, the server determines a fully qualified domain name (FQDN) of the application (520). In some implementations, the server 106 determines a host identifier of the application based on the data identifying the application. The server 106 may determine that the host identifier of the application is an IP address. The server 106 may determine the FQDN of the application based on the IP address using a reverse domain name service. In some implementations, the server 106 may determine that the host identifier of the application is a host name. The server 106 may determine that the application host name is an FQDN. In some implementations, the server 106 may determine that the application host name is not an FQDN. In this case, the server 106 may convert the application host name to an FQDN by adding one or more domains to the application host name.

The server 106 receives data identifying a computing infrastructure (530). In some implementations, the data identifying a computing infrastructure may be URL, a tag, and/or a similar identifier. In some implementations, the data identifying a computing infrastructure may include a range of identifiers where each identifier in the range may correspond to a computing instance of the computing infrastructure.

The server 106 determines a computing instance of the computing infrastructure (540). The computing instance may be a virtual or physical computing instance of the computing infrastructure. The server 106 may determine a computing instance identifier based on the data identifying the computing infrastructure. For example, the server 106 may select an IP address as the computing instance identifier based on receiving a range of IP addresses that identify the computing infrastructure.

The server 106 determines a fully qualified domain name of the computing instance (550). In some implementations, the server 106 determines a computing instance host identifier based on the data identifying the computing infrastructure. The server 106 may determine that the computing instance host identifier is an IP address. Based on the IP address, the server 106 may determine an FQDN for the computing instance using a reverse domain name service. In some implementations, the server 106 may determine that the computing instance host identifier is a host name. The sever 106 may determine that the computing instance host name is an FQDN. In some implementations, the server 106 may determine that the computing instance host name is not an FQDN. In this case, the server 106 may convert the computing instance host name to an FQDN by adding one or more domains to the computing instance host name.

The server 106 compares the fully qualified domain name of the application to the fully qualified domain name of the computing instance (560). In some implementations, the application FQDN and the computing instance FQDN may be strings. The server 106 may compare the application FQDN and the computing instance FQDN by comparing the strings. In some implementations, the server 106 may compare the application FQDN and the computing instance FQDN by attempting to access the corresponding computing devices.

Based on comparing the fully qualified domain name of the application to the fully qualified domain name of the computing instance, the server 106 determines whether the fully qualified domain name of the application matches the fully qualified domain name of the computing instance (570). In some implementations, the server 106 may determine that the application FQDN and the computing instance FQDN match if the strings of each match. In some implementations, the server 106 may determine that the application FQDN and the computing instance FQDN match if the server 106 accesses the same computing device for the application FQDN and the computing instance FQDN.

Based on determining whether the fully qualified domain name of the application matches the fully qualified domain name of the computing instance, the server 106 determines whether to provide, for output, data indicating whether the fully qualified domain name of the application matches the fully qualified domain name of the computing instance (580). In some implementations, the server 106 determines that the application FQDN matches the computing instance FQDN. In this case, the server 106 stores and/or outputs data indicating that the application FQDN matches the computing instance FQDN. In some instances, the server 106 provides the data indicating that the application FQDN matches the computing instance FQDN to a computing device that is configured to identify vulnerabilities in the application or the computing instance. In some implementations, the server 106 determines that the application FQDN does not match the computing instance FQDN. In this case, the server 106 may store and/or output data indicating that the application FQDN does not match the computing instance FQDN and/or bypass storing or outputting data indicating that the application FQDN matches the computing instance FQDN.

In some implementations, the server 106 may determine whether there are additional computing instances of the computing infrastructure. If there are additional computing instances, then the server 106 may identify those additional instances and repeat stages 540, 550, 560, 570, and 580. If there are no additional computing instances, then the server 106 may output data indicating that the matched application FQDNs and computing instance FQDNs to a computing device that is configured to identify vulnerabilities in the application or the computing instance. The server 106 may receive data identifying the vulnerabilities of the matched applications and computing instances. The server 106 may output, to a party responsible for the applications, data indicating the vulnerabilities of the computing instances that matched the applications. The server 106 may output, to a party responsible for the computing infrastructure, data indicating the vulnerabilities of the applications that matched the computing instances.

Figure 6:
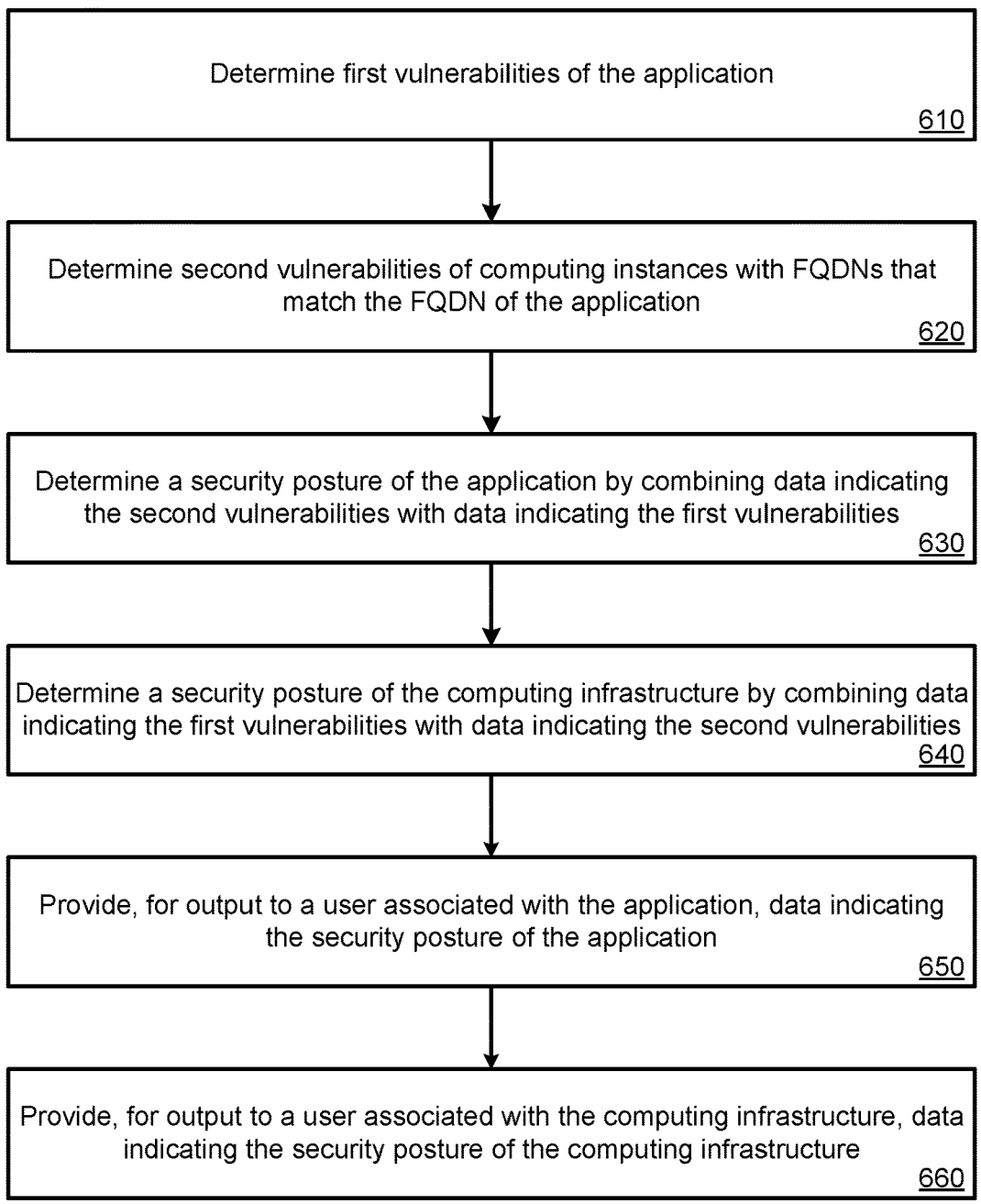
FIG. 6 is a flowchart of an example process for determining the holistic security posture of an application and a computing infrastructure.

FIG. 6 is a flowchart of an example process 600 for determining the holistic security posture of an application and a computing infrastructure. In general, the process 600 follows the process 500 of FIG. 5. The process 500 determines an association of the application and the computing instances where the application runs. The process 600 determines vulnerabilities for an application and associated computing instances and combines those vulnerabilities and provides data indicating those vulnerabilities to various users. The process 600 will be described as being performed by the server 106 of FIG. 1 and will include references to other components in FIG. 1.

The server 106 determines first vulnerabilities of the application (610). In some implementations, the server 106 may receive data indicating the first vulnerabilities from a computing device that is configured to configured to identify vulnerabilities in the application. The vulnerabilities may be weaknesses in the application that can be exploited by a threat actor.

The server 106 determines second vulnerabilities of computing instances with FQDNs that match the FQDN of the application (620). In some implementations, the server 106 may receive data indicating the second vulnerabilities from a computing device that is configured to identify vulnerabilities in computing instances. The vulnerabilities may be weaknesses in the computing instances or corresponding computing infrastructure that can be exploited by a threat actor.

The server 106 determines a security posture of the application by combining data indicating the second vulnerabilities with data indicating the first vulnerabilities (630). The server 106 determines a security posture of the computing infrastructure by combining data indicating the first vulnerabilities with data indicating the second vulnerabilities (640). Because the application is running on the computing infrastructure, the application is susceptible to the vulnerabilities of the computing infrastructure, and the computing infrastructure is susceptible to the vulnerabilities of the application. Therefore, to determine an overall security posture of the application and the computing infrastructure, it is appropriate to combine the data indicating the vulnerabilities of the application with the vulnerabilities of the computing instances where the application runs.

The server 106 provides, for output to a user associated with the application, data indicating the security posture of the application (650). The user associated with the application may be a developer and/or owner of the application. Based on the data indicating the security posture of the application, the user may update the application so that the application is less susceptible to the vulnerabilities of the computing instances running the application.

The server 106 provides, for output to a user associated with the computing infrastructure, data indicating the security posture of the computing infrastructure (660). The user associated with the computing infrastructure may be an operator and/or owner of the computing infrastructure. Based on the data indicating the security posture of the computing infrastructure, the user may update the computing infrastructure and/or instances of the infrastructure so that the computing infrastructure is less susceptible to the vulnerabilities of the application running on the computing infrastructure.

Figure 7:
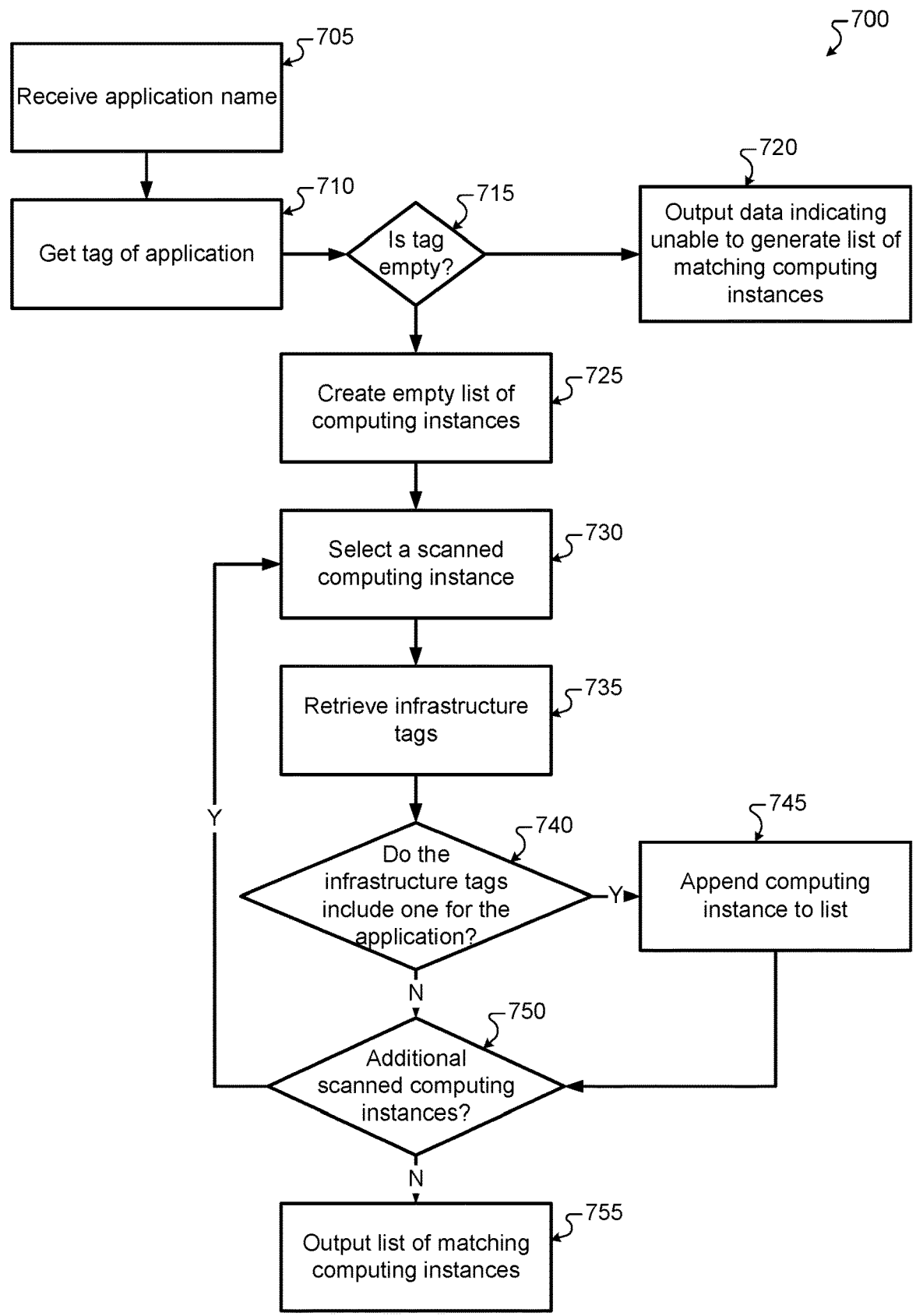
FIG. 7 is a flowchart of an example process for determining the holistic security posture of an application.

FIG. 7 is a flowchart of an example process 700 for determining the holistic security posture of an application. In general, the process 700 receives identifiers of one or more applications and one or more identifiers of computing infrastructure that implement various computing instances.

The identifiers may be tags. The process 700 compares the tags to determine which applications are running on which computing instances and outputs a list that includes that information. The process 700 will be described as being performed by the server 106 of FIG. 1 and will include references to other components in FIG. 1.

The server 106 receives an application name (705). The server 106 may receive the application name from a user. In some implementations, the application name may include a URL. In some implementations, the application name may not include a URL.

The server 106 accesses the tag of the application (710). The tag may be included in the metadata of the application. The name of the application may identify the object of the application and the tag may be a field that is included in the metadata. The server 106 may determine whether the tag is empty (715). If the tag is empty, then the server 106 may output data indicating that the server 106 is unable to determine which applications are running on which computing instances (720). If the tag is not empty, then the server 106 may create an empty list of computing instances (725). The stage 725 may be similar to the stage 230 of FIG. 2. The server 106 may receive identifiers for a computing infrastructure that may be running the application. The computing infrastructure may include one or more computing instances that may be physical or virtual. The server 106 may determine each of the computing instances that are included in the computing infrastructure.

The server 106 selects a scanned computing instance (730). The stage 730 may be similar to the stage 240 of FIG. 2. The server 106 may iterate through each of the computing instances in the infrastructure list. The computing instances in the infrastructure list may be computing instance names or other identifiers.

The server 106 accesses the tags of the selected computing instance (735). The tags may be included in the metadata of the computing instance. The name of the computing instance may identify the object of the computing instance, and the tags may be various fields that are included in the metadata.

The server 106 compares the tag of the application to the tags of the computing instance (740). If the tag of the application matches at least one of the tags of the computing instance, then the server 106 may append the computing instance name or other identifier to a list that includes the computing instances that are running the application (745). If the tag of the application does not match at least one of the tags of the computing instance, then the server 106 may bypass appending the computing instance name or other identifier to the list that includes the computing instances that are running the application.

The server 106 may determine whether there are additional scanned computing instances in the list of computing instances (750). If there are additional scanned computing instances, then the server 106 selects an additional computing instance (730). The server 106 identifies the tags of the additional computing instance (735). The server 106 compares the tags of the additional computing instances to the tag of the application (740). If there is a match, then the server 106 may append the computing instance name or other identifier to a list that includes the computing instances that are running the application. If there are no additional scanned computing instances, then server 106 outputs the list of computing instances that match the application FQDN (755). This list of computing instances may indicate the computing instances that are running the application.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, comprising:
   receiving, by a computing device, data identifying an application;
   based on the data identifying the application, determining, by the computing device, a fully qualified domain name of the application;
   receiving, by the computing device, data identifying a computing infrastructure;
   determining, by the computing device, a computing instance of the computing infrastructure;
   determining, by the computing device, a fully qualified domain name of the computing instance;
   comparing, by the computing device, the fully qualified domain name of the application to the fully qualified domain name of the computing instance;
   based on comparing the fully qualified domain name of the application to the fully qualified domain name of the computing instance, determining, by the computing device, whether the fully qualified domain name of the application matches the fully qualified domain name of the computing instance; and
   based on determining whether the fully qualified domain name of the application matches the fully qualified domain name of the computing instance, determining, by the computing device, whether to provide, for output, data indicating whether the fully qualified domain name of the application matches the fully qualified domain name of the computing instance.

2. The method of claim 1, wherein:
   determining whether the fully qualified domain name of the application matches the fully qualified domain name of the computing instance comprises determining that the fully qualified domain name of the application does not match the fully qualified domain name of the computing instance, and
   determining, whether to provide, for output, the data indicating that the fully qualified domain name of the application matches the fully qualified domain name of the computing instance comprises determining to bypass providing for output the data indicating that the fully qualified domain name of the application matches the fully qualified domain name of the computing instance.

3. The method of claim 1, wherein:
   determining whether the fully qualified domain name of the application matches the fully qualified domain name of the computing instance comprises determining that the fully qualified domain name of the application matches the fully qualified domain name of the computing instance,
   determining, whether to provide, for output, the data indicating that the fully qualified domain name of the application matches the fully qualified domain name of the computing instance comprises determining to provide, for output, the data indicating that the fully qualified domain name of the application matches the fully qualified domain name of the computing instance, and the method comprises:
providing, for output by the computing device and to an additional computing device that is configured to identify vulnerabilities in the application or the computing instance, the data indicating that the fully qualified domain name of the application matches the fully qualified domain name of the computing instance.

4. The method of claim 1, comprising:
after determining, whether to provide, for output, the data indicating that the fully qualified domain name of the application matches the fully qualified domain name of the computing instance, determining, by the computing device, an additional computing instance of the computing infrastructure;
determining, by the computing device, a fully qualified domain name of the additional computing instance;
comparing the fully qualified domain name of the application to the fully qualified domain name of the additional computing instance;
based on comparing the fully qualified domain name of the application to the fully qualified domain name of the additional computing instance, determining, by the computing device, whether the fully qualified domain name of the application matches the fully qualified domain name of the additional computing instance; and
based on determining whether the fully qualified domain name of the application matches the fully qualified domain name of the additional computing instance, determining, by the computing device, whether to provide, for output, data indicating that the fully qualified domain name of the application matches the fully qualified domain name of the additional computing instance.

5. The method of claim 1, comprising:
after determining, whether to provide, for output, the data indicating that the fully qualified domain name of the application matches the fully qualified domain name of the computing instance, determining, by the computing device, whether there is an additional computing instance of the computing infrastructure.

6. The method of claim 1, wherein:
receiving the data identifying the application comprises receiving a uniform resource locator (URL) of the application, and
determining the fully qualified domain name of the application comprises:
based on the URL of the application, determining a host identifier of the application;
determining that the host identifier of the application is an internet protocol (IP) address; and
based on the IP address, determining, using a reverse domain name service, the fully qualified domain name of the application.

7. The method of claim 1, wherein:
receiving the data identifying the application comprises receiving a uniform resource locator (URL) of the application, and
determining the fully qualified domain name of the application comprises:
based on the URL of the application, determining a host identifier of the application;
determining that the host identifier of the application is a host name; and
determining that the host name is the fully qualified domain name of the application.

8. The method of claim 1, wherein:
receiving the data identifying the application comprises receiving a uniform resource locator (URL) of the application, and
determining the fully qualified domain name of the application comprises:
based on the URL of the application, determining a host identifier of the application;
determining that the host identifier of the application is a host name;
determining that the host name is not a fully qualified domain name; and
based on the host name, determining the fully qualified domain name of the application.

9. The method of claim 1, wherein:
determining the computing instance of the computing infrastructure comprises determining a host identifier of the computing instance, and
determining the fully qualified domain name of the computing instance comprises:
determining that the host identifier of the computing instance is an internet protocol (IP) address; and
based on the IP address, determining, using a reverse domain name service, the fully qualified domain name of the computing instance.

10. The method of claim 1, wherein:
determining the computing instance of the computing infrastructure comprises determining a host identifier of the computing instance, and
determining the fully qualified domain name of the computing instance comprises:
determining that the host identifier of the computing instance is a host name; and
determining that the host name is the fully qualified domain name of the computing instance.

11. The method of claim 1, wherein:
determining the computing instance of the computing infrastructure comprises determining a host identifier of the computing instance, and
determining the fully qualified domain name of the computing instance comprises:
determining that the host identifier of the computing instance is a host name;
determining that the host name is not a fully qualified domain name; and
based on the host name, determining the fully qualified domain name of the computing instance.

12. The method of claim 1, wherein comparing the fully qualified domain name of the application to the fully qualified domain name of the computing instance comprises:
comparing a string of the fully qualified domain name of the application to a string of the fully qualified domain name of the computing instance.

13. The method of claim 1, wherein:
determining whether the fully qualified domain name of the application matches the fully qualified domain name of the computing instance comprises determining that the fully qualified domain name of the application matches the fully qualified domain name of the computing instance,
determining, whether to provide, for output, the data indicating that the fully qualified domain name of the application matches the fully qualified domain name of the computing instance comprises determining to provide, for output, the data indicating that the fully qualified domain name of the application matches the fully qualified domain name of the computing instance, and the method comprises:
  combining, by the computing device, data indicating the vulnerabilities of the application and data indicating the vulnerabilities of the computing instance;
  providing, for output to a user associated with the application, the combined data indicating the vulnerabilities of the application and vulnerabilities of the computing instance; and
  providing, for output to a user associated with the computing infrastructure, the combined data indicating the vulnerabilities of the application and vulnerabilities of the computing instance.

14. A system, comprising:
one or more processors; and
memory including a plurality of computer-executable components that are executable by the one or more processors to perform a plurality of actions, the plurality of actions comprising:
  receiving, by a computing device, data identifying an application;
  based on the data identifying the application, determining, by the computing device, a fully qualified domain name of the application;
  receiving, by the computing device, data identifying a computing infrastructure;
  determining, by the computing device, a computing instance of the computing infrastructure;
  determining, by the computing device, a fully qualified domain name of the computing instance;
  comparing, by the computing device, the fully qualified domain name of the application to the fully qualified domain name of the computing instance;
  based on comparing the fully qualified domain name of the application to the fully qualified domain name of the computing instance, determining, by the computing device, whether the fully qualified domain name of the application matches the fully qualified domain name of the computing instance; and
  based on determining whether the fully qualified domain name of the application matches the fully qualified domain name of the computing instance, determining, by the computing device, whether to provide, for output, data indicating whether the fully qualified domain name of the application matches the fully qualified domain name of the computing instance.

15. The system of claim 14, wherein:
determining whether the fully qualified domain name of the application matches the fully qualified domain name of the computing instance comprises determining that the fully qualified domain name of the application does not match the fully qualified domain name of the computing instance, and
determining, whether to provide, for output, the data indicating that the fully qualified domain name of the application matches the fully qualified domain name of the computing instance comprises determining to bypass providing for output the data indicating that the fully qualified domain name of the application matches the fully qualified domain name of the computing instance.

16. The system of claim 14, wherein:
determining whether the fully qualified domain name of the application matches the fully qualified domain name of the computing instance comprises determining that the fully qualified domain name of the application matches the fully qualified domain name of the computing instance,
determining, whether to provide, for output, the data indicating that the fully qualified domain name of the application matches the fully qualified domain name of the computing instance comprises determining to provide, for output, the data indicating that the fully qualified domain name of the application matches the fully qualified domain name of the computing instance, and
the method comprises:
  providing, for output by the computing device and to an additional computing device that is configured to identify vulnerabilities in the application or the computing instance, the data indicating that the fully qualified domain name of the application matches the fully qualified domain name of the computing instance.

17. The system of claim 14, wherein the actions comprise:
after determining, whether to provide, for output, the data indicating that the fully qualified domain name of the application matches the fully qualified domain name of the computing instance, determining, by the computing device, whether there is an additional computing instance of the computing infrastructure.

18. The system of claim 14, wherein the actions comprise:
after determining, whether to provide, for output, the data indicating that the fully qualified domain name of the application matches the fully qualified domain name of the computing instance, determining, by the computing device, an additional computing instance of the computing infrastructure;
determining, by the computing device, a fully qualified domain name of the additional computing instance;
comparing the fully qualified domain name of the application to the fully qualified domain name of the additional computing instance;
based on comparing the fully qualified domain name of the application to the fully qualified domain name of the additional computing instance, determining, by the computing device, whether the fully qualified domain name of the application matches the fully qualified domain name of the additional computing instance; and
based on determining whether the fully qualified domain name of the application matches the fully qualified domain name of the additional computing instance, determining, by the computing device, whether to provide, for output, data indicating that the fully qualified domain name of the application matches the fully qualified domain name of the additional computing instance.

19. The system of claim 14, wherein:
receiving the data identifying the application comprises receiving a uniform resource locator (URL) of the application, and
determining the fully qualified domain name of the application comprises:
  based on the URL of the application, determining a host identifier of the application;
  determining that the host identifier of the application is an internet protocol (IP) address; and
  based on the IP address, determining, using a reverse domain name service, the fully qualified domain name of the application.

20. One or more non-transitory computer-readable media of a computing device storing computer-executable instructions that upon execution cause one or more computers to perform acts comprising:
- receiving, by a computing device, data identifying an application;
- based on the data identifying the application, determining, by the computing device, a fully qualified domain name of the application;
- receiving, by the computing device, data identifying a computing infrastructure;
- determining, by the computing device, a computing instance of the computing infrastructure;
- determining, by the computing device, a fully qualified domain name of the computing instance;
- comparing, by the computing device, the fully qualified domain name of the application to the fully qualified domain name of the computing instance;
- based on comparing the fully qualified domain name of the application to the fully qualified domain name of the computing instance, determining, by the computing device, whether the fully qualified domain name of the application matches the fully qualified domain name of the computing instance; and
- based on determining whether the fully qualified domain name of the application matches the fully qualified domain name of the computing instance, determining, by the computing device, whether to provide, for output, data indicating whether the fully qualified domain name of the application matches the fully qualified domain name of the computing instance.

* * * * *